April 29, 1958            F. A. GROTH            2,832,094

MACHINE FOR DRAW OR DRAPE PLASTIC MOLDING

Filed June 25, 1954            3 Sheets-Sheet 1

INVENTOR
FRED A. GROTH
BY
*Harry N. Hitzeman*
ATTORNEY.

April 29, 1958 F. A. GROTH 2,832,094
MACHINE FOR DRAW OR DRAPE PLASTIC MOLDING
Filed June 25, 1954 3 Sheets-Sheet 2
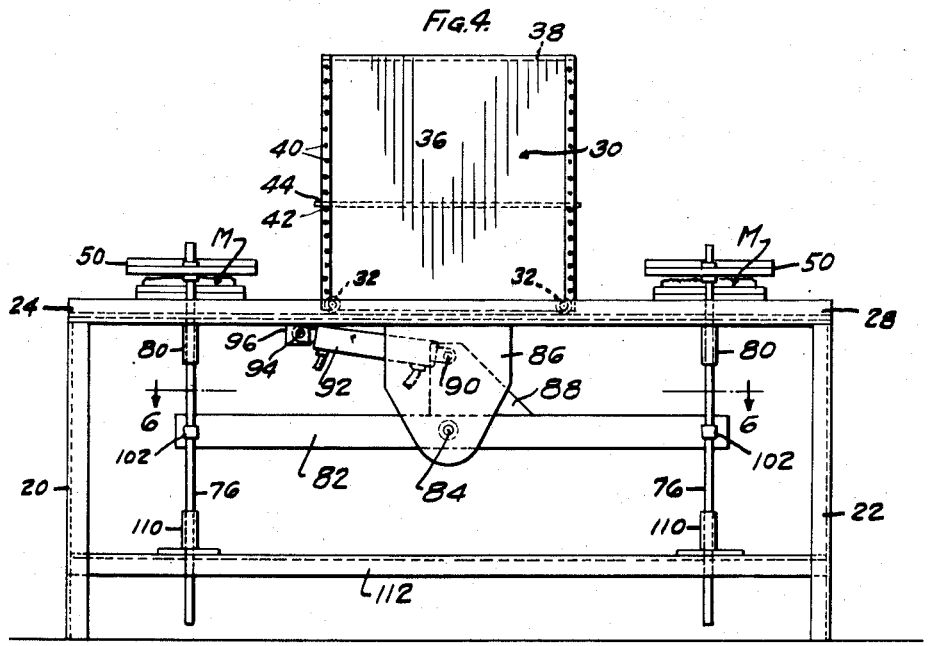
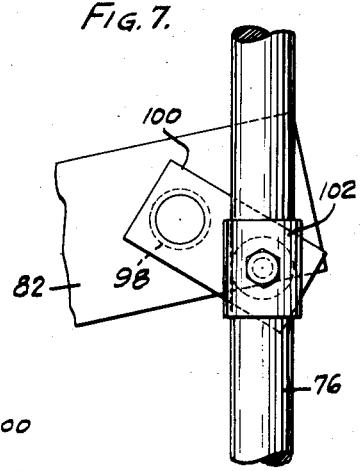
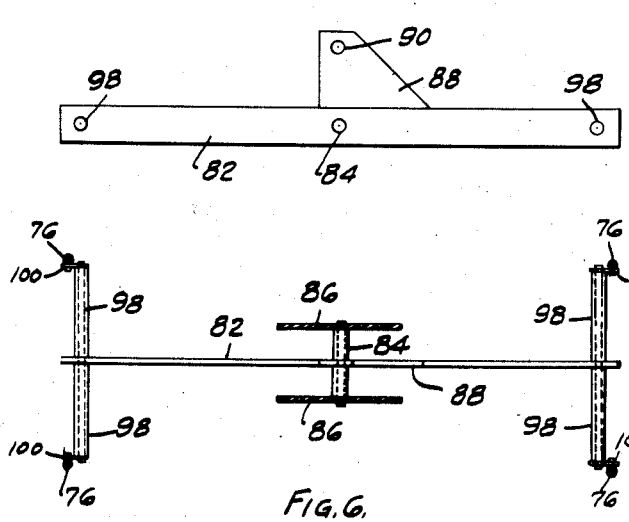
INVENTOR.
FRED A. GROTH
BY
Harry N. Hitzeman
ATTORNEY.

April 29, 1958        F. A. GROTH        2,832,094
MACHINE FOR DRAW OR DRAPE PLASTIC MOLDING
Filed June 25, 1954        3 Sheets-Sheet 3

INVENTOR.
FRED A. GROTH
BY
*Harry N. Hitzeman*
ATTORNEY.

United States Patent Office 2,832,094
Patented Apr. 29, 1958

2,832,094

MACHINE FOR DRAW OR DRAPE PLASTIC MOLDING

Fred A. Groth, Chicago, Ill.

Application June 25, 1954, Serial No. 439,423

5 Claims. (Cl. 18—19)

My invention relates to improvements in plastic molding machines.

My invention relates more particularly to the treatment of sheet plastic which is adapted to be heated and formed over a mold, and when cooled again becomes rigid in the shape to which it has been molded.

Plastic molding has been done by what is generally known as a vacuum draw system, which process includes the steps of mounting a sheet of rigid plastic in a frame, placing it over a cavity which is in the shape of the article desired, heating the plastic sheet until it becomes pliable, and then by introducing vacuum, drawing the pliable plastic down into the cavity to assume the shape of the same. In this process, in drawing vacuum into a negative or hollow mold, the sheet plastic, when it is drawn down into the mold by the vacuum, being held about its periphery, portions of the same are stretched during the process, thus producing in certain areas of the molded product a comparatively thinner wall than other portions of the same.

The principal object of the invention is to provide a machine of the type described which is comparatively automatic in operation and which is capable of multiple production, as contrasted with the apparatus at present in use.

A further object of the present invention is to provide an apparatus of the class described which is easily and cheaply manufactured and which will give long usage without becoming broken or out of order.

Other objects and advantages will be more apparent from the following description wherein reference is had to the accompanying drawings, upon which Fig. 1 is a generally diagrammatic sectional view showing the present vacuum drawing method and the manner in which the plastic sheet is stretched in various areas to conform to the female or negative mold;

Fig. 4 is a side elevational view of one machine or apparatus for carrying out my improved method;

Fig. 5 is a side elevational view of the rocking beam which I employ for the multiple action produced;

Fig. 6 is a plan sectional view showing the rocking beam and connecting to the plastic sheet holding frame operating rod members, taken generally on the line 6—6 of Fig. 1;

Fig. 7 is an enlarged side sectional view showing the connecting link between the rocking beam and the operating rods;

Figure 1:
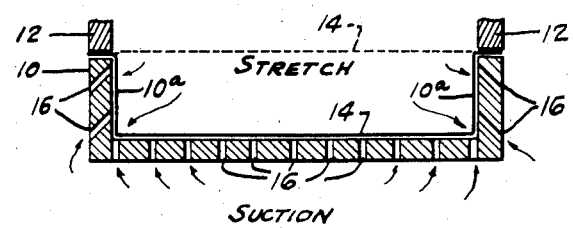
Figure 2:
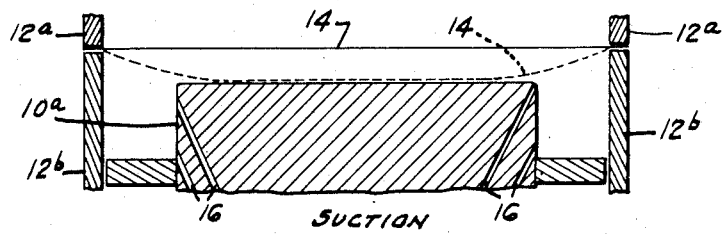
Fig. 2 is a similar diagrammatic sectional view showing my improved method in which the mold is reversed and in the nature of a male or positive die.
Figure 3:
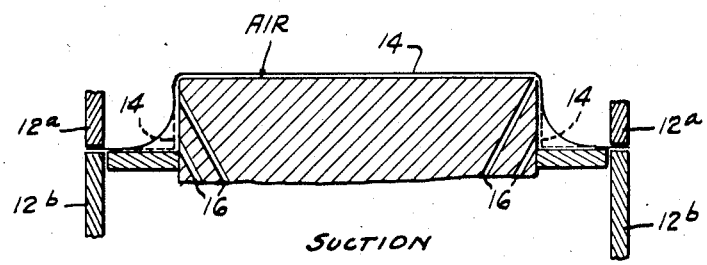
Fig. 3 is a similar diagrammatic sectional view showing the manner in which the flexible plastic has been draped over and drawn against the surface of the male or positive mold without stretching the same in any way.

In the diagrammatic views which I have chosen to illustrate the invention, in Fig. 1 I have shown the usual type of mold 10, together with a holder 12 for firmly holding the edges of a plastic sheet 14. As is taught by the present method, the sheet is subjected to heat from above until the same has reached a certain fluid stage where it can be formed to any flexible shape. Suction is now applied to the negative mold 10 through the various openings 16, and the flexible plastic is drawn tightly against the walls of the mold. The plastic is then cooled to again reach a rigid condition, after which the holder 12 is released and the shaped product is removed from the die.

It will be noted, however, that in this method of producing a molded plastic object from a thermo-plastic sheet, the material is of necessity stretched along the walls 10a of the mold, the degree depending entirely upon the depth desired and the amount of surface area over which the material must be stretched to provide the finished product. Thus it can be seen that with .030 inch thickness of plastic, the side walls adjacent 10a are of necessity stretched so that the thickness of the overall walls of the article will vary greatly.

In the improved method which I have provided, I place a sheet of thermo-plastic material 14 between a pair of holders 12a and 12b. After sufficient heat has been applied in the usual method so that the plastic sheet has become thoroughly flexible, the supporting frame is lowered to permit the draping of the material over the contours of the male mold 10a. The plastic material in this condition balloons out and parachutes down, trapping a slight layer of air between the top of the mold and the plastic sheet. Suction is now applied in the usual manner to conform the plastic object to the exact contour of the male mold, after which the plastic is cooled and the finished product removed. However, due to the trapping of a thin layer of air on the top of the mold as described, this surface is crystal clear due to its rapid cooling and spacing from contact with the mold.

By this method it can be seen that the thickness of the wall remains the same throughout, the plastic due to its flexibility when it is draped or drawn down over the male mold member requiring no stretching when the suction is applied, the suction only pulling the material against the sides of the mold, and the finished object will have a wall thickness that is consistent throughout.

Figure 8:
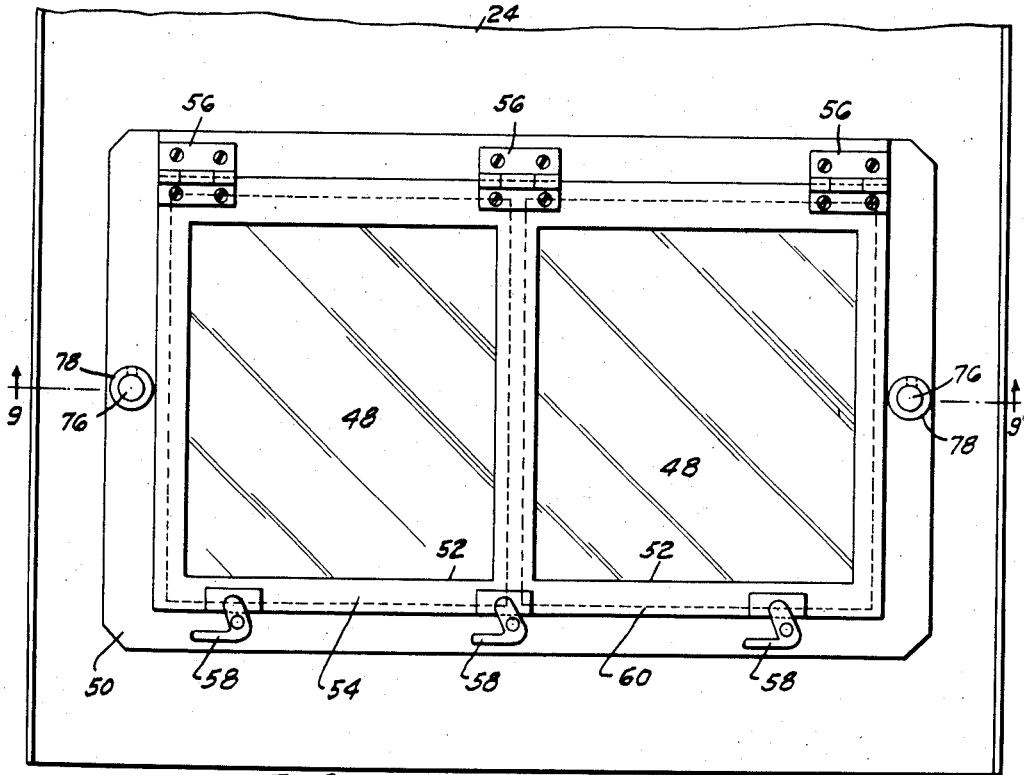
Fig. 8 is a fragmentary plan view showing a multiple plastic sheet holding frame on one end of the table for the machine.
Figure 9:
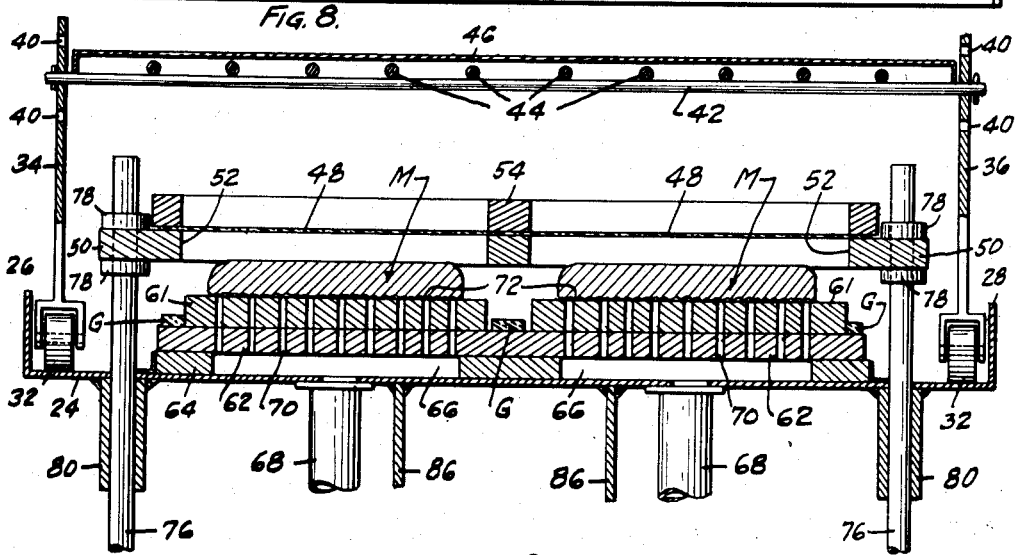
Fig. 9 is a cross-sectional view thereof taken generally on the line 9—9 of Fig. 8.

In one embodiment of a machine for carrying out this method, I provide a structural steel frame which includes vertical support members 20 and 22 to support a longitudinally extending table 24. The table 24, as best shown in Figs. 4, 8 and 9, may be provided with vertical edge walls 26 and 28 to confine the movement of a heating oven 30 that is mounted upon two sets of rollers 32 located adjacent the edges of the table and being fastened in the lower ends of the side walls 34 and 36 of the oven 30.

The oven 30 may be of the usual type having the side walls 34 and 36, open front and back ends, and a top wall 38. Adjacent the vertical edges of the side walls I provide a plurality of aligned openings 40 spaced from a point adjacent the lower edge of the oven to a point adjacent the top of the same to receive support rods 42 for heating elements such as "Cal" rods 44. The amount of these heating elements may vary in accordance with the nature of the article to be molded and the thickness of the sheets of plastic which are employed. I provide a cover 46 over the heating elements, the cover having down-turned edges to rest upon the support rods 42, Plastic sheets 48 to be molded to a desired shape may be placed in a rectangular holding frame 50, the frame in the embodiment shown having a pair of rectangular openings 52 and being provided with a hold-down frame or bracket 54 mounted by a plurality of hinges 56 on the top of the frame 50. A pair of plastic sheets 48 may thus be placed over the openings 52 of the frame 50 and the hold-down frame swung down over them and the sheets locked in position by suitable latch members 58 adjacent the side 60 of the frame 54.

The positive or male molds M may have mounting bases or platforms 61 whose peripheral edges conform to and enter the openings 52 of the frame 50. The bases 61 are positioned upon a suitable platform 62 which is positioned upon a rectangular support 64 on the table 24, the support 64 having suitable openings 66 therein to permit a vacuum through the air suction pipes 68 to reach the mold platform 62. The platform 62 and bases 61 are provided with a plurality of openings 70 extending to the bottom of the mold M, the bases 61 having upon their top surfaces a member such as a screen 72 to space the mold slightly above the platform and permit suction to reach all parts of the same.

The support frame 64 is preferably sealed about its peripheral edges on the table top with scotch tape or other suitable material 74 to prevent the escape of air about the same.

The mounting bases 61, platform 62, and support frame 64, as well as the hold-down frame 50, are all preferably made of wood, since in the cooling operation it permits quicker action and does not retain heat like a metal frame would. A compressible gasket G, as shown, is preferably provided around the outline of each mold base to permit a certain amount of tolerance in the stroke of the frame carrier and also to insure an air-tight seal around each mold.

Means for raising and lowering the plastic sheet holding frame 50 may include a set of vertical operating rods 76 which extend through suitable openings in the edges of the frame 50 and are secured thereto by means of a pair of collars 78 upon both sides of the frame 50. The collars are fastened to the rods by means of set screws so that the height of the same may be adjusted to comply with the side of the rods M. The rod 76 may be guided in suitable collar members 80, welded or otherwise secured to the bottom of the table 24.

In the apparatus shown I have provided two sets of molds M, one at each end of the table 24, and two plastic sheet holding frames 50, so that in actual use when one set of molded sheets is being cooled, as is necessary, the oven 30 may be moved to the other end of the table to apply heat to the sheets in the other frame.

Means for raising and lowering the frames after a molding operation may include a rocking beam 82 mounted upon a medial shaft 84 supported by a pair of bearings 86 suspended from the bottom of the table 24. The rocking beam 84 may have an upwardly extending arm 88 pivotally connected at 90 to the plunger of an air cylinder 92 connected at its other end to a pivot 94 mounted in a bearing 96 fastened to the bottom of the table 24. A suitable source of air (not shown) is provided for the same.

The rocking beam 82, as best shown in Fig. 6, may have a pair of rod members 98 extending transversely therefrom at both ends of the same, the rod members being connected by means of link members 100 to rod couplings 102 which are fastened to the reciprocating rods 76 that carry the sheet supporting frame 50. Vertical bearings 110 are mounted on a cross-brace 112 adjacent the lower end of the machine to assure vertical reciprocation of the rods 76.

With the apparatus which has been shown, it is possible to have a continuous operation of plastic molding of the type described, the heating oven 30 being moved first to the left and then to the right for the heating cycle, the operator cooling and removing the molded plastic objects at one end while the heating cycle is being performed at the other.

From the above and foregoing description it can be seen that I have provided a machine or apparatus whereby continuous and volume production may be obtained. If desired, mechanism may be provided including timer switches and thermostatic controls so that the operation of the oven from one position to the other may be completely automatic.

I contemplate that changes and modifications may be made in the exact details shown and I do not wish to be limited in any particular; rather what I desire to secure and protect by Letters Patent of the United States is:

1. Apparatus for the molding of thermo-plastic sheets comprising a horizontally disposed table, a heating oven mounted for reciprocal movement on said table, said oven having a top wall, side walls and open end walls, sets of rollers connected to lower edges of side walls to support said oven on said table, said side walls having a plurality of aligned openings spaced adjacent the vertical edges of the same, support rods extending through a desired row of said openings, heating elements positioned on said support rods, a cover on said support rods over said heating elements, a plastic sheet holding frame at each end of said table, a male mold positioned therebeneath and means for moving said frame downwardly over said mold after the sheet has been heated, said means comprising a rocker arm pivoted below the center of said table, vertical rods connected to each of said frames and a link connection between the said vertical rods and said rocker arm, said table having vertical guides through which said rods oscillate, said frames being adjustable on said rods.

2. A rectangularly shaped horizontal table having parallel vertical edge walls, a heating oven having rollers for supporting the same on said table, adjustably mounted heating elements in said oven, a plastic sheet holding frame adjacent each end of said horizontal table, each frame having a pair of rectangular openings therethrough, a hinged hold-down bracket mounted on the top of each frame, mounting bases for male molds positioned on the table, said bases having peripheral edges which conform to and enter the rectangular openings of said holding frames, a source of vacuum connected to each of said bases and means for raising and lowering said sheet holding frames in sequence, said means including a pair of vertical rod members connected to opposite sides of said holding frames, said rods extending downwardly through said table, a horizontally disposed shaft positioned below said table medially between the ends of the same, a rocking beam mounted on said shaft, means for actuating the same to raise one end and then the other, and transverse rod members connected to the ends of said rocking beam and pivotally connected to the ends of said pairs of vertical rod members.

3. A rectangularly shaped horizontal table having parallel vertical edge walls, a heating oven mounted thereon, said oven having a top wall, side walls and open end walls, sets of rollers connected to lower edges of side walls to support said oven on said table, said side walls having a plurality of aligned openings spaced adjacent the vertical edges of the same, support rods extending through a desired row of said openings, heating elements positioned on said support rods, a cover on said support rods over said heating elements, a plastic sheet holding frame adjacent each end of said horizontal table, each frame having an opening therethrough, a hinged hold-down bracket mounted on the top of each frame, a mounting base for a male mold positioned on the table, said base having peripheral edges which conform to and enter the opening of said holding frame, a source of vacuum connected to said base and means for raising and lowering said sheet holding frames, in sequence, said means including a pair of vertical rod members connected to opposite sides of said holding frames, said rods extending downwardly through said table, a horizontally disposed shaft positioned below said table medially between the ends of the same, a rocking beam mounted on said shaft, means for actuating the same to raise one end and then the other, and transverse rod members connected to the ends of said rocking beam and pivotally connected to the ends of said pairs of vertical rod members.

4. A rectangularly shaped horizontal table having parallel vertical edge walls, a heating oven mounted thereon, said oven having a top wall, side walls and open end walls, sets of rollers connected to lower edges of side walls to support said oven on said table, said side walls having a plurality of aligned openings spaced adjacent the vertical edges of the same, support rods extending through a desired row of said openings, heating elements positioned on said support rods, a cover on said support rods over said heating elements, a plastic sheet holding frame adjacent each end of said horizontal table, each frame having a pair of rectangular openings therethrough, a hinged hold-down bracket mounted on the top of each frame, mounting bases for male molds positioned on the table, said bases having peripheral edges which conform to and enter the rectangular openings of said holding frames, a source of vacuum connected to each of said bases and means for raising and lowering said sheet holding frames in sequence, said means including a pair of vertical rod members connected to opposite sides of said holding frames, said rods extending downwardly through said table, a horizontally disposed shaft positioned below said table medially between the ends of the same, a rocking beam mounted on said shaft, means for actuating the same to raise one end and then the other, and transverse rod members connected to the ends of said rocking beam and pivotally connected to the ends of said pairs of vertical rod members.

5. A rectangularly shaped horizontal table having parallel vertical edge walls, a heating oven mounted thereon, said oven having a top wall, side walls and open end walls, sets of rollers connected to lower edges of side walls to support said oven on said table, said side walls having a plurality of aligned openings spaced adjacent the vertical edges of the same, support rods extending through a desired row of said openings, heating elements positioned on said support rods, a cover on said support rods over said heating elements, a plastic sheet holding frame adjacent each end of said horizontal table, each frame having a pair of rectangular openings therethrough, a hinged hold-down bracket mounted on the top of each frame, mounting bases for male molds positioned on the table, said bases having peripheral edges which conform to and enter the rectangular openings of said holding frames, a source of vacuum connected to each of said bases and means for raising and lowering said sheet holding frames in sequence, said means including a pair of vertical rod members connected to opposite sides of said holding frames, said rods extending downwardly through said table, a horizontally disposed shaft positioned below said table medially between the ends of the same, a rocking beam mounted on said shaft, means for actuating the same to raise one end and then the other, and transverse rod members connected to the ends of said rocking beam and pivotally connected to the ends of said pairs of vertical rod members, said pairs of vertical rod members adjustably connected to each of said holding frames to permit a variance of the up and down movement of each frame.

References Cited in the file of this patent

UNITED STATES PATENTS

| 673,982 | Hamet | May 14, 1901 |
| 2,086,147 | Yeates | July 6, 1937 |
| 2,142,445 | Helwig | Jan. 13, 1939 |
| 2,442,338 | Borkland | June 1, 1948 |
| 2,606,343 | Cooper | Aug. 12, 1952 |
| 2,694,227 | Fordyce | Nov. 16, 1954 |

OTHER REFERENCES

"Modern Plastic," pages 90 and 91, May 1954.